United States Patent [19]

Brooks et al.

[11] Patent Number: 5,290,601
[45] Date of Patent: Mar. 1, 1994

[54] COATING COMPOSITION

[75] Inventors: Rodney R. Brooks, Tyne and Wear; Michael J. Winter, Newcastle-Upon-Tyne, both of United Kingdom

[73] Assignee: Courtaulds Coatings (Holdings) Limited, United Kingdom

[21] Appl. No.: 927,437
[22] PCT Filed: Mar. 26, 1991
[86] PCT No.: PCT/GB91/00454
 § 371 Date: Sep. 22, 1992
 § 102(e) Date: Sep. 22, 1992
[87] PCT Pub. No.: WO91/14747
 PCT Pub. Date: Oct. 3, 1991

[30] Foreign Application Priority Data

Mar. 27, 1990 [GB] United Kingdom ............... 9006840

[51] Int. Cl.$^5$ ................ B29D 9/00; B32B 27/30
[52] U.S. Cl. ................ 427/412.4; 427/387; 525/101; 525/104; 525/102; 524/268; 524/269; 524/506
[58] Field of Search ............ 525/104, 102, 101; 427/412.4, 387; 524/268, 269, 506

[56] References Cited

U.S. PATENT DOCUMENTS

| 3,702,778 | 11/1972 | Mueller et al. | |
| 4,070,421 | 1/1978 | Etter, Jr. | 260/897 C |
| 4,431,472 | 2/1984 | Hohl et al. | 156/307.3 |
| 4,758,624 | 7/1988 | Sekiguchi et al. | 525/101 |
| 4,833,187 | 5/1989 | Sittenthaler et al. | 524/188 |

FOREIGN PATENT DOCUMENTS

| 0016195 | 10/1980 | European Pat. Off. . |
| 0089066 | 9/1983 | European Pat. Off. . |
| 0260661 | 3/1988 | European Pat. Off. . |
| 0287085 | 10/1988 | European Pat. Off. . |
| 0323906 | 7/1989 | European Pat. Off. . |
| 0329375 | 8/1989 | European Pat. Off. . |
| 2636958 | 3/1990 | France . |
| 53-137231 | 11/1978 | Japan . |
| 53-137233 | 11/1978 | Japan . |
| 53-137234 | 11/1978 | Japan . |
| 57-200456 | 6/1981 | Japan . |
| 57-096048 | 6/1982 | Japan . |
| 1307001 | 12/1973 | United Kingdom . |
| 1470465 | 4/1977 | United Kingdom . |
| 1581727 | 12/1980 | United Kingdom . |
| 2141436 | 12/1984 | United Kingdom . |

*Primary Examiner*—Ralph H. Dean
*Attorney, Agent, or Firm*—Howson and Howson

[57] ABSTRACT

A primer composition for application to a substrate to promote adhesion of a room-temperature-vulcanizable silicone rubber coating, comprises (A) an aminosilane material, (B) a chlorinated polyolefin and (C) a room-temperature-curable polydiorganosiloxane. The aminosilane material (A) is a primary amine-functional silane or the reaction product of a primary amine-functional silane with an epoxy-functional silane or an alpha, omega-dihydroxypolydimethylsiloxane oil.

19 Claims, No Drawings

COATING COMPOSITION

FIELD OF THE INVENTION

This invention relates to a primer composition for application to a substrate to promote adhesion of a room-temperature-vulcanisable (RTV) silicone rubber coating.

RTV silicone rubber coatings are applied to underwater surfaces, for example ships' hulls, the cooling water inlets and outlets of power stations, fish-farming equipment and the underwater and splash-zone surfaces of oil production platforms, to inhibit fouling by aquatic organisms such as algae and barnacles.

BACKGROUND OF THE INVENTION

Silicone rubber fouling-resistant coatings are described for example in GB-A-1307001, GB-A-1470465, GB-A-1581727, GB-A-2141436, EP-A-16195 and U.S. Pat. No. 3,702,778. RTV silicone rubber coatings have also been suggested as coatings inhibiting the adhesion of ice, for example on the superstructure and topsides of ships.

A problem in the use of such RTV silicone rubber coatings is that it is difficult to make them adhere well to substrates. This problem is discussed in EP-A-16195 which proposes applying the RTV silicone rubber as a cladding on a fabric backing.

Various primer compositions have been suggested for room-temperature-vulcanisable silicone rubber antifoulings. U.S. Pat. No. 3,702,778 proposes a crosslinkable silicone paste. EP-A-89066 proposes a mixture of an epoxysilane and a silane containing an unsaturated hydrocarbon group. JP-A-53-137231, JP-A-53-137233 and JP-A-53-137234 propose various elastomeric materials such as polyurethane, natural rubber, chloroprene or neoprene rubber or butyral/silicone rubber. EP-A-323906 and EP-A-329375 propose a silicone resin containing an aminosilane.

U.S. Pat. No. 4,070,421 describes the use of chlorinated polyethylene as a primer for improving adhesion of coatings on polyolefin surfaces.

SUMMARY OF THE INVENTION

A primer composition according to the invention for application to a substrate to promote adhesion of an RTV silicone rubber coating comprises:

(A) an aminosilane material which is (i) a primary amine-functional silane of the formula:

$$(RO)_xR_{(3-x)}SiR^1NHR^2 \quad (I)$$

where the radicals R, which can be the same or different, are monovalent hydrocarbon radicals having 1 to 12 carbon atoms and optionally containing an ether linkage; $R^1$ is an alkylene radical having 2 to 4 carbon atoms or a divalent aliphatic ether radical having 3 to 8 carbon atoms; $R^2$ is hydrogen or an alkylene radical of 2 to 4 carbon atoms tipped with a primary amine group; and x is 2 or 3; or (ii) the reaction product of a primary amine-functional silane of the formula (I) with an epoxy-functional silane of the formula:

$$A-Si(B)_a(OB)_{(3-a)} \quad (II)$$

where A is an epoxide-substituted monovalent hydrocarbon radical having 4 to 12 carbon atoms; the radicals B, which can be the same or different, are alkyl radicals having 1 to 4 carbon atoms; and a is 0 or 1; or (iii) the reaction product of a primary amine-functional silane of the formula (I) with an alpha, omega-dihydroxypolydimethylsiloxane oil of the formula:

$$HO(Si(CH_3)_2O)_yH \quad (III)$$

in which y is 2 to 60;

(B) a chlorinated polyolefin; and (C) a room-temperature-curable polydiorganosiloxane.

DETAILED DISCLOSURE

In the primary amine-functional silane of formula (I) the radicals R are preferably alkyl, for example methyl, ethyl, hexyl or octyl, aryl, for example phenyl, or aralkyl, for example benzyl. The alkylene radical $R^1$ is preferably $-(CH_2)_3-$, $-(CH_2)_4-$ or methyl-substituted trimethylene, or can be $-(CH_2)_3-O-(CH_2)_2$, $-(CH_2)_3-O-(CH_2)_3-$ or $-CH_2-O-(CH_2)_2-$. $R^2$ is preferably hydrogen or $-CH_2CH_2NH_2$. It may be preferred to separate any ether oxygen atom in R and $R^1$ by at least two carbon atoms from the nearest heteroatom. Examples of primary amine-functional silanes of formula (I) are: $(CH_3O)_3Si(CH_2)_3NH(CH_2)_2NH_2$; $(CH_3CH_2OCH_2CH_2O)_3Si(CH_2)_2NH_2$; $(C_2H_5O)_3Si(CH_2)_3NH_2$; $(CH_3OCH_2CH_2O)_3Si(CH_2)_3NH_2$; $(C_2H_5O)_3Si(CH_2)_3O(CH_2)_3NH_2$; $(C_2H_5O)_2C_6H_5Si(CH_2)_3NH_2$; $(C_2H_5O)_3SiCH_2O(CH_2)_2NH_2$; $(C_2H_5O)_3Si(CH_2)_3O(CH_2)_2NH_2$; and $(C_2H_5O)_2CH_3Si(CH_2)_3NH_2$. Mixtures of two or more primary amine-functional silanes (I) may be used if desired.

The primary amine-functional silane (I) is preferably used as such in the primer composition. It can however be replaced wholly or in part by a reaction product of the primary amine-functional silane (I) and an epoxy-functional silane (II). The group A in the epoxy-functional silane (II) is preferably a glycidoxy-substituted alkyl group, for example 3-glycidoxypropyl. The epoxy-functional silane (II) can for example be 3-glycidoxypropyl trimethoxy silane, 3-glycidoxypropyl diethoxy methoxy silane, 2-glycidoxypropyl trimethoxy silane, 3-(3,4-epoxycyclohexyl)propyl trimethoxy silane or 2-(3,4-epoxy-4-methylcyclohexyl)-ethyl trimethoxy silane. Examples of preferred reaction products of an amine-functional silane (I) and an epoxy-functional silane (II) are:

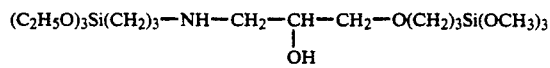

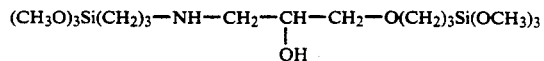

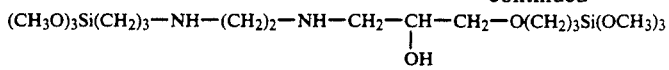

The aminosilane (I) and the epoxysilane (II) can be reacted at 20°-80° C., preferably using 0.4-1.2 primary amine groups of aminosilane (I) per epoxide group in (II).

In a further alternative, the primary amine-functional silane (I) is replaced wholly or in part by a reaction product of the primary amine-functional silane (I) and an alpha, omega-dihydroxypolydimethylsiloxane (III). (I) and (III) can be reacted at 20°-80° C., preferably using 0.4-1.2 alkoxy groups of aminosilane (I) per silanol group in (III).

The chlorinated polyolefin (B) preferably has a molecular weight of 5,000 to 50,000 and a chlorine content of 15 to 75%, most preferably 17 to 40%, by weight. Chlorinated polyolefins are commercially available. They can be prepared by treating a polyolefin with chlorine in the presence of a peroxide catalyst. The chlorination reaction is preferably carried out in a solvent for the polyolefin starting material. The polyolefin is preferably a poly(alpha-olefin) such as polyethylene or polypropylene. The polyolefin can be of high or low density, amorphous or crystalline. It can be a copolymer of two or more olefins, preferably alpha-olefins. Suitable chlorinated polyolefins are described for example in U.S. Pat. No. 3,561,965 and U.S. Pat. No. 4,070,421.

The chlorinated polyolefin (B) can be used in conjunction with another chlorinated hydrocarbon resin, for example a chlorinated polyterpene resin or chlorinated polystyrene. The polystyrene is preferably of low molecular weight (less than 5000). Such a chlorinated hydrocarbon resin preferably has a similar degree of chlorination to the chlorinated polyolefin. The chlorinated hydrocarbon resin can for example be used in an amount of from 1 to 100% by weight based on the chlorinated polyolefin (B).

The aminosilane material (A) is generally used at 0.1 to 50% by weight based on the chlorinated material (chlorinated polyolefin (B) plus any other chlorinated hydrocarbon resin), most preferably 1 to 20% by weight.

The room-temperature-curable polydiorganosiloxane (C) is preferably a polydiorganosiloxane of viscosity 700 to 1,000,000 m Pa s at 25° C. It preferably contains silicon-bonded hydroxyl groups, for example an alpha, omega-dihydroxypolydiorganosiloxane, or silicon-bonded hydrolysable groups, for example a polydiorganosiloxane tipped with silicon-bonded hydrolysable groups. More preferably, it is formed of recurring diorganosiloxy units of the formula $-R^4_2SiO-$ where the radicals $R^4$, which can be the same or different, represent hydrocarbon radicals having 1 to 10 carbon atoms. It is preferred that at least 50% of the radicals $R^4$ are methyl groups. The dihydroxypolydiorganosiloxane may further contain monoorganosiloxy groups of the formula $R^4SiO_{1.5}$ and/or siloxy groups of the formula $SiO_2$ in a maximum proportion of 2% with respect to the number of diorganosiloxy groups $R^4_2SiO$.

The hydrocarbon radicals represented by the symbol $R^4$ in the di- and mono-organosiloxy units may suitably be selected from alkyl radicals such as methyl, ethyl, n-propyl, isopropyl, n-butyl, n-pentyl, n-hexyl, 2-ethyl hexyl or n-octyl, cycloalkyl radicals having from 4 to 8 carbon atoms such as cyclopentyl, cyclohexyl or methylcyclohexyl, alkenyl radicals having from 2 to 4 carbon atoms such as vinyl, allyl or buten-2-yl, and aryl radicals having from 6 to 8 carbon atoms such as phenyl, tolyl or xylyl.

As preferred examples of the groups represented by $R^4_2SiO$ the following formulae are noted:

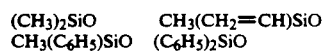

One example of a suitable alpha, omega-dihydroxy polydimethylsiloxane is that sold by Rhone Poulenc under the trade name "48V 3500".

Alpha, omega-dihydroxypolydiorganosiloxanes can readily be prepared by well-known techniques described, for example, in FR-A-1134005, FR-A-1198749 and FR-A-1226745. The polydiorganosiloxanes are preferably separated from volatile by-products before use, for example by the devolatilisation process described in U.S. Pat. No. 4,356,116.

Preferred alpha, omega-dihydroxypolydimethylsiloxanes consist of successive groups of the formula $(CH_3)_2SiO$ or contain up to 10%, for example 2-10%, by mole of their groups $R^4$ as phenyl groups, for example in the form of $(C_6H_5)_2SiO$ units.

Alpha, omega-dihydroxypolydiorganosiloxanes are generally used with a curing agent, for example a compound containing at least two silicon-bonded hydrolysable groups per molecule. Examples of suitable curing agents are ketiminoxysilanes, acyloxysilanes and alkoxysilanes, tetraalkyl titanates and aluminium alcoholates.

A ketiminoxysilane curing agent preferably contains at least two silicon-bonded hydrolysable ketiminoxy groups per molecule. Such a curing agent is preferably used at 1 to 18 parts by weight per 100 parts of alpha,omega-dihydroxypolydiorganosiloxane. The ketiminoxysilane curing agent may have the general formula:

$$Y^1_f SiZ^1_{(4-f)}$$

in which:
 $Y^1$ represents a hydrocarbon radical having 1 to 10 carbon atoms, which may be substituted by halogen or cyano;
 $Z^1$ represents a hydrolysable radical of the formula:

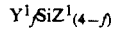

or

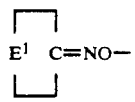

in which the groups $Z^2$, which can be the same or different, represent $C_1-C_8$ hydrocarbon radicals and $E^1$ represents a $C_4-C_8$ alkylene radical; the groups $Z^1$ can be the same or different; and f represents 0 or 1.

Examples of group $Y^1$ are those listed above as examples of group $R^4$ in the diorganosiloxy units.

Examples of ketiminoxysilane curing agents are those of the formulae:

$CH_3Si[ON=C(CH_3)_2]_3$, $CH_3Si[ON=C(CH_3)C_2H_5]_3$,
$(CH_2=CH)Si[ON=C(CH_3)C_2H_5]_3$,
$C_6H_5Si[ON=C(CH_3)_2]_3$,
$CH_3Si[ON=C(C_2H_5)(CH_2)_3CH_3]_3$,
$(CH_3)_2C=NOSi[ON=C(CH_3)C_2H_5]_3$,

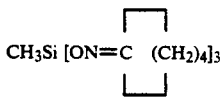

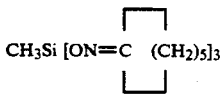

$Si[ON=C(C_2H_5)(CH_3)]_4$ or $Si[ON=C(CH_3)_2]_4$ and their mixtures.

An acyloxysilane curing agent can for example have the formula:

$R^5{}_aSi(OCOR^6)_{4-a}$, where $R^5$ is defined as for group $R^4$ mentioned above, $R^6$ is a monovalent hydrocarbon radical, e.g. of up to 8 carbon atoms, without aliphatic unsaturation and a is 0 or 1. The radicals $R^6$ can for example be alkyl such as methyl, ethyl, n-propyl, n-butyl or n-hexyl, cycloalkyl such as cyclopentyl or cyclohexyl, or aryl such as phenyl, tolyl or xylyl. Examples of acyloxysilane curing agents are:

$CH_3Si(OCOCH_3)_3$
$C_2H_5Si(OCOCH_3)_3$
$CH_2=CHSi(OCOCH_3)_3$
$C_6H_5Si(OCOCH_3)_3$
$CH_3Si(OCOCH(C_2H_5)(CH_2)_3CH_3)_3$
$CF_3CH_2CH_2Si(OCOC_6H_5)_3$

An acyloxysilane curing agent can for example be used at 2-20% by weight based on the alpha, omega-dihydroxypolydiorganosiloxane.

An alkoxysilane curing agent can for example be a tetraalkyl orthosilicate (tetraalkoxysilane) such as tetraethyl orthosilicate or an alkyl trialkoxysilane such as methyl trimethoxysilane, ethyl trimethoxysilane or methyl triethoxysilane. Alkoxysilane curing agents such as tetraethyl orthosilicate are particularly preferred for use with moisture-curable polydiorganosiloxanes.

The room-temperature-curable polydiorganosiloxane (C) can be moisture-curable because atmospheric moisture is usually present when coating a marine surface. A moisture-curable polydiorganosiloxane can for example have hydrolysable end groups. The polydiorganosiloxane (C) containing silicon-bonded hydrolysable groups is preferably formed by combining an alpha,omega-dihydroxypolydiorganosiloxane with a compound containing at least two silicon-bonded hydrolysable groups per molecule. Examples of suitable compounds of this type are the ketiminoxysilanes and acyloxysilanes described above as curing agents, for example methyl triacetoxy silane, which form polydiorganosiloxanes tipped with silicon-bonded hydrolysable ketiminoxy or acyloxy groups. Reaction between the silicon-bonded hydroxyl groups of the alpha,omega-dihydroxypolydiorganosiloxane and the silicon-bonded hydrolysable groups of the said compound generally takes place as these materials are combined, so that the polydiorganosiloxane (C) is at least partially tipped with silicon-bonded hydroxyl groups.

An alternative polydiorganosiloxane (C) tipped with silicon-bonded hydrolysable groups is an amine-tipped polydiorganosiloxane, for example an alpha,omega-diaminopolydiorganosiloxane of the formula:

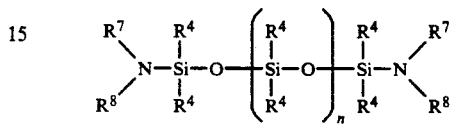

where $R^4$ is defined as above, n is an integer such that the polydiorganosiloxane has a viscosity of 700–1,000,000 m Pa s at 25° C., and $R^7$ and $R^8$ each represent hydrogen or a monovalent hydrocarbon group having 1 to 10 carbon atoms. Most preferably $R^7$ represents hydrogen and $R^8$ represents an alkyl group having 2 to 6 carbon atoms, for example ethyl, propyl, isopropyl, n-butyl or sec-butyl (but-2-yl). Examples of amine-tipped polydiorganosiloxanes are sold under the Trade Marks "Silgan 500" and "Silgan 501J".

The room-temperature-curable polydiorganosiloxane (C) is preferably used at 0.1 to 100 parts by weight, more preferably 1 to 50 parts by weight, per part by weight of the chlorinated material (chlorinated polyolefin (B) plus any other chlorinated hydrocarbon resin).

The primer composition may contain a catalyst for the room-temperature curing of the polydiorganosiloxane. Examples of catalysts are metallic and organometallic salts of carboxylic acids. Metallic salts may be salts of tin, lead, nickel, cobalt, iron, chromium, zinc or manganese, for example stannous octoate. Preferred organometallic salts are diorganotin carboxylate compounds such as dibutyltin dilaurate or dibutyltin acetate. Organic titanium derivatives containing at least one —Ti—O—Si— or —Ti—O—C— linkage, e.g. an alkanolamine titanate, and organic zirconium derivatives can be used as catalyst, as described in U.S. Pat. No. 4,525,565.

The primer compositions preferably contain an organic diluent which can for example be an aliphatic, cycloaliphatic or aromatic hydrocarbon which is optionally halogenated such as n-heptane, n-octane, cyclohexane, methylcyclohexane, toluene, xylene, mesitylene, cumene, tetrahydronaphthalene, perchloroethylene, trichloroethane, tetrachloroethane, chlorobenzene or orthodichlorobenzene, an aliphatic or cycloaliphatic ketone such as methylethylketone, methylisobutylketone, methylisoamylketone, cyclohexanone or isophorone; an ether such as a dialkyl ether of ethylene glycol or propylene glycol, or an ester such as ethyl acetate, butyl acetate or ethoxyethyl acetate. The diluent is preferably a solvent for the chlorinated polyolefin (B), including any other chlorinated hydrocarbon resin present. The weight ratio of diluent to chlorinated polyolefin plus any other chlorinated hydrocarbon resin is preferably in the range 1:3 to 20:1, more preferably 2:3 to 10:1. The weight ratio of diluent to room-temperature-curable polydiorganosiloxane is usually 1:50 to 20:1, preferably 1:10 to 3:1.

The primer composition can be prepared by mixing the aminosilane material (A) and the chlorinated polyolefin (B) with the room-temperature-curable polydiorganosiloxane (C). The chlorinated polyolefin (B) and any other chlorinated hydrocarbon resin present are preferably dissolved in an organic solvent before mixing with the aminosilane material (A) and the polydiorganosiloxane (C).

The primer composition can also contain additives selected from pigments, mineral fillers, thixotropic agents, stabilisers, surfactants, antioxidants and plasticisers. It may be preferred to include colouring pigments in the primer composition so that it can be overcoated by a fouling-resistant layer of clear RTV silicone rubber. When incorporating pigments, it may be necessary to take precautionary steps to avoid any moisture present in the pigment from instigating premature curing of the room-temperature-curable polydiorganosiloxane (C). The simplest precaution is to ensure that any pigments used are thoroughly dry. Alternatively, the pigments can be dispersed in a diluent, preferably a polydiorganosiloxane, which inhibits reaction of any moisture present in the pigment with the room-temperature-curable polydiorganosiloxane (C). The pigment can for example be dispersed in a non-reactive polydiorganosiloxane oil such as a methyl-tipped polydimethylsiloxane oil before the pigment contacts the room-temperature-curable polydiorganosiloxane (C) (including any curing agent therefor) and preferably also before the pigment contacts the aminosilane material (A). In an alternative procedure the pigment is dispersed in a liquid hydroxyl-tipped polydiorganosiloxane before the pigment contacts the aminosilane material (A) or any curing agent or material containing silicon-bonded hydrolysable groups which forms part of the room-temperature-curable polydiorganosiloxane (C). When this alternative procedure is used, the liquid hydroxyl-tipped polydiorganosiloxane used as dispersion medium will generally become co-cured with the room-temperature-curable polydiorganosiloxane (C). It can itself be used as the room-temperature-curable polydiorganosiloxane (C), in conjunction with a curing agent added later. It is generally preferred however that a liquid hydroxyl-tipped polydiorganosiloxane used as dispersion medium for the pigment forms only part of the polydiorganosiloxane (C); for example it can be used with a later-added moisture-curable polydiorganosiloxane (C) tipped with hydrolysable groups.

The primer composition is particularly effective in promoting adhesion to organic resin substrates such as neoprene rubber, chlorinated rubber, block copolymer rubbers such as polystyrene/polybutadiene or polystyrene/poly(ethylene-butylene) rubbers, polyurethanes (both elastomers and thermoplastic resins), epoxy coatings, vinyl resins such as vinyl chloride polymers or alkyd resins. These resins may for example be in the form of cladding in the case of neoprene and similar rubbers, or may be previously-applied coatings, for example anticorrosive coatings which are to be covered by a silicone rubber antifouling paint, or old antifouling coatings which are to be overcoated. The primer composition also promotes adhesion to metal substrates such as aluminium or steel.

The primer composition can be applied to the substrate by any known coating technique. Usually it is applied by spray, brush or roller.

The RTV silicone rubber fouling-resistant coating which is applied over the primer composition can for example be based on an alpha, omega-dihydroxypolydiorganosiloxane as described above, used with a curing agent selected from those described above and optionally a catalyst selected from those described above. Alternatively, the RTV silicone rubber can be a polydiorganosiloxane tipped with silicon-bonded hydrolysable groups as described above, for example silicon-bonded ketiminoxy or acyloxy groups. It may be preferred that the curing agent or silicon-bonded hydrolysable groups in the room-temperature-curable diorganopolysiloxane (C) in the primer composition and the curing agent or silicon-bonded hydrolysable groups in the RTV silicone rubber coating are the same. The RTV silicone rubber coating preferably includes a non-reactive silicone oil, for example of the formula: $Q_3Si$—$O$—$(SiQ_2$—$O$—$)_nSiQ_3$, wherein each group Q represents a hydrocarbon radical having 1-10 carbon atoms and n is an integer such that the silicone oil has a viscosity of 20 to 5000 m Pa s. At least 10% of the groups Q are generally methyl groups and at least 2% of the groups Q are preferably phenyl groups. Most preferably, at least 25% of the —$SiQ_2$—$O$— units are methylphenylsiloxane units. Most preferably the non-reactive silicone oil is a methyl-terminated poly(methylphenylsiloxane). The oil preferably has a viscosity of 20 to 1000 m Pa s and is preferably used at 1 to 50%, most preferably 2 to 20%, by weight based on the RTV silicone rubber. An example of a preferred non-reactive silicone oil is that sold under the Trade Mark "Rhodorsil Huile 550". The non-reactive silicone oil improves the resistance of the composition to aquatic fouling.

Instead of, or in addition to, the non-reactive silicone oil, the RTV silicone rubber composition can contain a non-reactive fluid organic hydrocarbon, for example a lubricating mineral oil such as white oil, a low molecular weight polybutene or petrolatum or a liquid paraffin/petrolatum mixture. Such a non-reactive fluid organic hydrocarbon is preferably absent from the primer composition.

The primer composition improves the overall adhesion of the RTV silicone rubber to the substrate to a greater extent than can be achieved in the absence of any of the essential components (A), (B) and (C). The aminosilane material (A) and chlorinated polyolefin (B) ensure strong adhesion of the primer to the RTV silicone rubber and to the organic resin substrate respectively. We have however found that when a composition comprising aminosilane material (A), chlorinated polyolefin (B) and solvent is applied to many organic resin substrates it is rapidly absorbed by the substrate, so that adhesion of a subsequently applied RTV silicone rubber coating is poor unless it is applied very soon. The room-temperature-curable polydiorganosiloxane (C) counteracts the tendency for the primer composition to be absorbed by the substrate, allowing a much longer time period, for example up to a week or even longer, within which overcoating with an RTV silicone rubber composition can be achieved with good adhesion.

The primer composition according to the invention has much greater adhesion to many substrates, in particular neoprene, chloroprene or hydrocarbon rubbers, than a composition which does not contain chlorinated polyolefin. On all substrates, including those such as epoxy resin where the simple combination of room-temperature-curable polydiorganosiloxane and aminosilane material gives good adhesion, the chlorinated polyolefin improves the resistance to sea water immersion; good adhesion of the primer composition to the substrate and of the RTV silicone rubber top coat to the primer composition is maintained even after 18 months or more of immersion in sea water.

The invention is illustrated by the following Examples in which parts and percentages are by weight.

EXAMPLE 1

25 parts of a 40% solution in xylene of a chlorinated polyethylene (chlorine content 22%) was mixed with 2 parts N-(2-aminoethyl)-3-aminopropyl trimethoxy silane and diluted with 73 parts xylene.

14 parts of the resulting composition was mixed with 61 parts of a room-temperature-curable polydiorganosiloxane composition and 25 parts methyl isoamyl ketone solvent. The room-temperature-curable polydiorganosiloxane composition comprised an alpha, omega-dihydroxypolydimethylsiloxane used with a ketiminoxysilane curing agent.

The resulting primer composition was applied to a neoprene rubber substrate, and also to substrates coated with epoxy resin, polyurethane, vinyl resin and alkyd resin anticorrosive paints, and to a substrate having the residue of an old antifouling paint based on rosin, a vinyl chloride copolymer and cuprous oxide. In all cases the coating of primer composition could be overcoated with an RTV silicone rubber fouling-resistant composition based on an alpha, omega-dihydroxypolydiorganosiloxane with a ketiminoxysilane curing agent and a non-reactive poly(methyl phenyl siloxane) oil about 10 minutes after application of the primer composition with good adhesion of the RTV composition, and could also be overcoated with the RTV composition 24 hours later with good adhesion.

The overcoated materials were immersed in sea water. Adhesion between the primer composition and the substrates, and between the RTV silicone rubber fouling-resistant coating and the primer composition, remained strong after 18 months immersion in sea water.

EXAMPLE 2

29.7 parts of pigments and fillears (barytes, titanium dioxide, fumed silica and black iron oxide) and 0.1 part of dibutyltin dilaurate curing catalyst were dispersed by milling in 6.7 parts of non-reactive methyl-tipped polydimethylsiloxane oil and 10.6 parts of methyl isoamyl ketone solvent. The resulting pigment dispersion was mixed with 36.4 parts of room-temperature-curable polydimethylsiloxane tipped with ketiminoxy groups, 8.3 parts of the solution of chlorinated polyethylene and N-(2-aminoethyl)-3-aminopropyl trimethoxy silane described in Example 1 and 8.2 parts of methyl isoamyl ketone.

The resulting primer composition was applied to epoxy resin, neoprene rubber and urethane rubber substrates. These samples were overcoated after 16 to 48 hours with the RTV silicone rubber of Example 1.

The overcoated materials were immersed in sea water. Adhesion between the primer composition and the substrates, and between the RTV silicone rubber fouling-resistant coating and the primer composition, remained strong after 16 months' immersion in sea water.

EXAMPLE 3

28.1 parts of pigments and fillers (titanium dioxide, barytes, black iron oxide and fumed silica) were dispersed by milling in 11.5 parts of liquid hydroxyl-tipped polydimethylsiloxane with 0.5 part of wetting aid and 11.4 parts of methyl isoamyl ketone. The resulting pigment dispersion was mixed with 7.6 parts of the solution of chlorinated polyethylene and N-(2-aminoethyl)-3-aminopropyl trimethoxy silane described in Example 1, 30.9 parts of room-temperature-curable polydimethylsiloxane tipped with ketiminoxy groups, 0.03 part of dibutyltin dilaurate and 10.0 parts of methyl isoamyl ketone.

The resulting primer composition was applied to substrates of epoxy resin, aluminium, urethane rubber, neoprene rubber, a substrate having a residue of old antifouling paint as described in Example 1, polystyrene/polybutadiene block copolymer rubber and polystyrene/poly(ethylene-butylene) block copolymer rubber. These samples were overcoated after 16 to 48 hours with the RTV silicone rubber of Example 1.

The overcoated materials were immersed in sea water. Adhesion between the primer composition and the substrates, and between the RTV silicone rubber fouling-resistant coating and the primer composition, remained strong after 6 months' immersion in sea water.

We claim:

1. A primer composition for application to a substrate to promote adhesion of a room-temperature-vulcanisable silicone rubber coating, which primer composition comprises:
   (A) an amino-substituted silicon compound which is selected from the group consisting of:
      (i) primary amine-functional silanes of the formula:

$$(RO)_x R_{(3-x)} SiR^1 NHR^2 \tag{I}$$

where the radicals R, which can be the same or different, are monovalent hydrocarbon radicals having 1 to 12 carbon atoms and optionally containing an ether linkage; $R^1$ is an alkylene radical having 2 to 4 carbon atoms or a divalent aliphatic ether radical having 3 to 8 carbon atoms; $R^2$ is hydrogen or a (primary amino)-alkyl group having 2 to 4 carbon atoms; and x is 2 or 3;

(ii) reaction products of a primary amine-functional silane of the formula (I) with an epoxy-functional silane of the formula:

$$A—Si(B)_a(OB)_{(3-a)} \tag{II}$$

where A is an epoxide-substituted monovalent hydrocarbon radical having 4 to 12 carbon atoms; the radicals B, which can be the same or different, are alkyl radicals having 1 to 4 carbon atoms; and a is 0 or 1; and (iii) reaction products of a primary amine-functional silane of the formula (I) with an alpha, omega-dihydroxypolydimethylsiloxane oil of formula:

$$HO(Si(CH_3)_2 O)_y H \tag{III}$$

in which y is 2 to 60;

(B) a chlorinated polyolefin; and
   (C) a polydiorganosiloxane composition which is self-curable or moisture-curable at ambient temperature.

2. A primer composition according to claim 1, wherein the polydiorganosiloxane composition (C) comprises an alpha, omega-dihydroxypolydiorganosiloxane and a ketiminoxysilane curing agent.

3. A primer composition according to claim 1, wherein the polydiorganosiloxane composition (C) comprises an alpha, omega-dihydroxypolydiorganosiloxane and an acyloxysilane curing agent.

4. A primer composition according to claim 1, wherein the polydiorganosiloxane composition (C) comprises an alpha, omega-dihydroxypolydiorganosiloxane and an alkoxysilane curing agent.

5. A primer composition according to claim 1, wherein the polydiorganosiloxane composition (C) comprises a polydiorganosiloxane containing silicon-bonded hydrolysable groups as terminal groups.

6. A primer composition according to claim 5, wherein the silicon-bonded hydrolysable groups are ketiminoxy, acyloxy or amine groups.

7. A primer composition according to claim 1 wherein the chlorinated polyolefin (B) has a chlorine content of 17 to 40% by weight.

8. A primer composition according to claim 1, wherein the composition contains another chlorinated hydrocarbon resin in addition to the chlorinated polyolefin (B), said another chlorinated hydrocarbon resin being present in an amount of 1 to 100% by weight based on the chlorinated polyolefin (B).

9. A primer composition according to claim 1, wherein the aminosilane material (A) is present in an amount of 1 to 20% by weight based on the weight of chlorinated polyolefin (B) present in the composition.

10. A primer composition according to claim 1, wherein the weight ratio of the polydiorganosiloxane composition (C) to the chlorinated polyolefin (B) present in the composition is 1:1 to 50:1.

11. A primer composition according to claim 1, wherein a pigment is dispersed in the composition.

12. A primer composition according to claim 8, wherein the aminosilane material (A) is present in an amount of 1 to 20% by weight based on the weight of chlorinated polyolefin (B) plus any other chlorinated hydrocarbon resin present in the composition.

13. A primer composition according to claim 8, wherein the weight ratio of the polydiorganosiloxane composition (C) to the chlorinated polyolefin (B) plus any other chlorinated hydrocarbon resin present in the composition is 1:1 to 50:1.

14. A process for preparing a pigmented primer composition comprising dispersing a pigment in a non-reactive polydiorganosiloxane oil and mixing the resulting pigment dispersion with:

(A) an amino-substituted silicon compound which is selected from the group consisting of
   (i) primary amine-functional silanes of the formula:

$(RO)_xR_{(3-x)}SiR^1NHR^2$     (I)

where the radicals R, which can be the same or different, are monovalent hydrocarbon radicals having 1 to 12 carbon atoms and optionally containing an ether linkage; $R^1$ is an alkylene radical having 2 to 4 carbon atoms or a divalent aliphatic ether radical having 3 to 8 carbon atoms; $R^2$ is hydrogen or a (primary amino)-alkyl group having 2 to 4 carbon atoms; and x is 2 or 3;

(ii) reaction products of a primary amine-functional silane of the formula (I) with an epoxy-functional silane of the formula:

$A\!-\!Si(B)_a(OB)_{(3-a)}$     (II)

where A is an epoxide-substituted monovalent hydrocarbon radical having 4 to 12 carbon atoms; the radicals B, which can be the same or different, are alkyl radicals having 1 to 4 carbon atoms; and a is 0 or 1; and (iii) reaction products of a primary amine-functional silane of the formula (I) with an alpha, omega-dihydroxypolydimethylsiloxane oil of formula:

$HO(Si(CH_3)_2O)_yH$     (III)

in which y is 2 to 60;

(B) a chlorinated polyolefin; and (C) a polydiorganosiloxane composition which is self-curable or moisture-curable at ambient temperature, said step of dispersing the pigment in a non-reactive polydiorganosiloxane oil being carried out before the pigment contacts the amino-substituted silicon compound (A) or the polydiorganosiloxane composition (C).

15. A process for preparing a pigmented primer composition comprising dispersing a pigment in a liquid hydroxyl-terminated polydiorganosiloxane and mixing the resulting pigment dispersion with (A) an amino-substituted silicon compound which is selected from the group consisting of
   (i) primary amine-functional silanes of the formula:

$(RO)_xR_{(3-x)}SiR^1NHR^2$     (I)

where the radicals R, which can be the same or different, are monovalent hydrocarbon radicals having 1 to 12 carbon atoms and optionally containing an ether linkage; $R^1$ is an alkylene radical having 2 to 4 carbon atoms or a divalent aliphatic ether radical having 3 to 8 carbon atoms; $R^2$ is hydrogen or a (primary amino)-alkyl group having 2 to 4 carbon atoms; and x is 2 or 3;

(ii) reaction products of a primary amine-functional silane of the formula (I) with an epoxy-functional silane of the formula:

$A\!-\!Si(B)_a(OB)_{(3-a)}$     (II)

where A is an epoxide-substituted monovalent hydrocarbon radical having 4 to 12 carbon atoms; the radicals B, which can be the same or different, are alkyl radicals having 1 to 4 carbon atoms; and a is 0 or 1; and (iii) the reaction products of a primary amine-functional silane of the formula (I) with an alpha, omega-dihydroxypolydimethylsiloxane oil of the formula:

$HO(Si(CH_3)_2O)_yH$     (III)

in which y is 2 to 60;

(B) a chlorinated polyolefin; and (C) a polydiorganosiloxane composition which is self-curable or moisture-curable at ambient temperature, said step of dispersing the pigment in a liquid hydroxyl-terminated polydiorganosiloxane being carried out before the pigment contacts the amino-substituted silicon compound (A) or any curing agent or material containing silicon-bonded hydrolysable groups which forms part of the polydiorganosiloxane (C).

16. A process for preparing a pigmented primer composition comprising dispersing a pigment in a liquid hydroxyl-terminated polydiorganosiloxane and mixing the resulting pigment dispersion with
(A) an amino-substituted silicon compound which is selected from the group consisting of
  (i) primary amine-functional silanes of the formula:

$$(RO)_xR_{(3-x)}SiR^1NHR^2 \tag{I}$$

where the radicals R, which can be the same or different, are monovalent hydrocarbon radicals having 1 to 12 carbon atoms and optionally containing an ether linkage; $R^1$ is an alkylene radical having 2 to 4 carbon atoms or a divalent aliphatic ether radical having 3 to 8 carbon atoms; $R^2$ is hydrogen or a (primary amino)-alkyl group having 2 to 4 carbon atoms and x is 2 or 3;
  (ii) reaction products of a primary amine-functional silane of the formula (I) with an epoxy-functional silane of the formula:

$$A-Si(B)_a(OB)_{(3-a)} \tag{II}$$

where A is an epoxide-substituted monovalent hydrocarbon radical having 4 to 12 carbon atoms; the radicals B, which can be the same or different, are alkyl radicals having 1 to 4 carbon atoms; and a is 0 or 1; and
  (iii) reaction products of a primary amine-functional silane of the formula (I) with an alpha, omega-dihydroxypolydimethylsiloxane oil of the formula:

$$HO(Si(CH_3)_2O)_yH \tag{III}$$

in which y is 2 to 60;
(B) a chlorinated polyolefin; and
(C) a curing agent which together with the liquid hydroxyl-terminated polydiorganosiloxane forms the room-temperature-curable polydiorganosiloxane (C),
said step of dispersing the pigment in a liquid hydroxyl-terminated polydiorganosiloxane being carried out before the pigment contacts the amino-substituted silicon compound (A) or the said curing agent.

17. A process for coating a substrate with a room-temperature-vulcanisable silicone rubber composition, wherein the substrate is coated with a primer composition which comprises:
(A) an amino-substituted silicon compound which is selected from the group consisting of
  (i) primary amine-functional silanes of the formula:

$$(RO)_xR_{(3-x)}SiR^1NHR^2 \tag{I}$$

where the radicals R, which can be the same or different, are monovalent hydrocarbon radicals having 1 to 12 carbon atoms and optionally containing an ether linkage; $R^1$ is an alkylene radical having 2 to 4 carbon atoms or a divalent aliphatic ether radical having 3 to 8 carbon atoms; $R^2$ is hydrogen or a (primary amino)-alkyl group having 2 to 4 carbon atoms; and x is 2 or 3;
  (ii) reaction products of a primary amine-functional silane of the formula (I) with an epoxy-functional silane of the formula:

$$A-Si(B)_a(OB)_{(3-a)} \tag{II}$$

where A is an epoxide-substituted monovalent hydrocarbon radical having 4 to 12 carbon atoms; the radicals B, which can be the same or different, are alkyl radicals having 1 to 4 carbon atoms; and a is 0 or 1; and
  (iii) reaction products of a primary amine-functional silane of the formula (I) with an alpha, omega-dihydroxypolydimethylsiloxane oil of formula:

$$HO(Si(CH_3)_2O)_yH \tag{III}$$

in which y is 2 to 60;
(B) a chlorinated polyolefin; and
(C) a polydiorganosiloxane composition which is self-curable or moisture-curable at ambient temperature; and
the room-temperature-vulcanisable silicone rubber composition is applied over the said primer composition.

18. A process according to claim 17, wherein the polydiorganosiloxane (C) of the primer composition comprises an alpha, omega-dihydroxypolydiorganosiloxane and a curing agent selected from the group consisting of ketiminoxysilane, acyloxysilane and alkoxysilane curing agents, and the room-temperature-vulcanisable silicone rubber composition comprises an alpha, omega-dihydroxypolydiorganosiloxane and a curing agent of the same type as used in the primer composition.

19. A process according to claim 17, wherein the polydiorganosiloxane (C) of the primer composition is a polydiorganosiloxane containing silicon-bonded hydroxyl groups as terminal groups and the room-temperature-vulcanisable silicone rubber composition comprises a polydiorganosiloxane terminated with silicon-bonded hydrolysable groups of the same type as those in the room-temperature-curable polydiorganosiloxane (C).

* * * * *